UNITED STATES PATENT OFFICE.

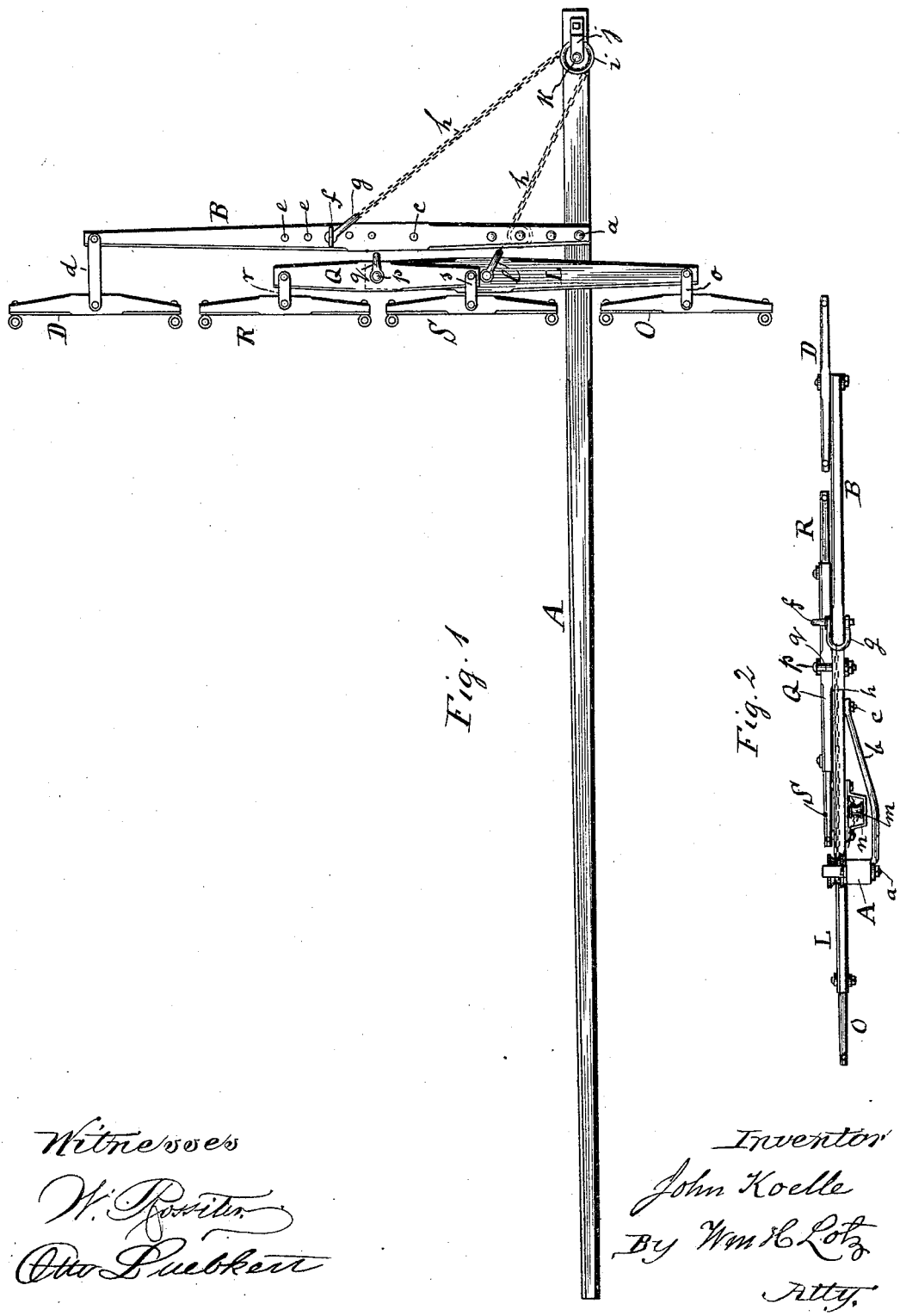

JOHN KOELLE, OF REVILLO, SOUTH DAKOTA.

DRAFT-EQUALIZER.

SPECIFICATION forming part of Letters Patent No. 416,338, dated December 3, 1889.

Application filed October 8, 1889. Serial No. 326,352. (No model.)

*To all whom it may concern:*

Be it known that I, JOHN KOELLE, a citizen of the United States of America, residing at Revillo, in the county of Grant and State of South Dakota, have invented certain new and useful Improvements in Four - Horse Equalizers, of which the following is a specification, reference being had therein to the accompanying drawings.

This invention relates to devices for arranging the whiffletrees for more than two horses to pull abreast and for all to possess an equal leverage; and it is the object of this my invention to provide a device by which four horses can be thus hitched to a harvester or other agricultural machine with one horse to one side of the tongue and three horses to the opposite side of the tongue all pulling abreast and with the draft equalized to be proportional to the strength and energy of the several horses; and with these objects in view my invention consists of the novel devices hereinafter described, and specifically claimed.

In the accompanying drawings, Figure 1 represents a plan view, and Fig. 2 a rear elevation showing my improved arrangement of the splinter-bar and double and single trees as connected with the vehicle-tongue.

Corresponding letters of reference in the several figures of the drawings designate like parts.

A denotes the tongue, generally made rigid with the frame of a reaper. To this tongue A is pivotally secured one end of a splinter bar or lever B by a bolt $a$ passed through the splinter-bar and the tongue and through the eyed end of a brace $b$, rigidly secured against the bottom side of the splinter-bar by a bolt $c$. To the opposite or outwardly - extended end of the splinter-bar B is coupled by two links a whiffletree or singletree D. The middle portion of splinter-bar B is pierced with a series of holes $e$, with either one of which is to be connected by a pin $f$ a clevis $g$, coupled to one end of a chain $h$, which chain $h$ is passed around a pulley $i$, pivotally secured upon the rear end of tongue A, below an eye-bracket $j$, rigidly secured upon such tongue to turn upon the fulcrum-bolt K, and thence the opposite end of the chain $h$ is passed through the opening between splinter-bar B and brace-bar $b$, and is coupled to clevis $l$, having secured by a bolt the doubletree L, and for the purpose of properly guiding such chain $h$ a pulley $m$ is pivotally secured against the bottom of splinter-bar B within a frame $n$, against which the chain $h$ will rest.

The doubletree L, resting upon tongue A about one-third of its length, extends over the tongue, where to its end by links $o$ is coupled the whiffle or single tree O. Upon the opposite end of doubletree L is coupled by a bolt $p$ and clevis $q$ another doubletree Q, which is somewhat shorter than doubletree L, and to the ends of this doubletree Q are coupled by links $r$ and $s$ whiffle or single trees R and S. The distance between clevis $l$ and links $o$ of doubletree L being about twice the distance between clevis $l$ and pin $p$, the leverage thus obtained will enable a single horse hitched to whiffletree O to equalize the strength of two horses hitched to whiffletrees R and S, and, again, the chain $h$ can be connected to any hole $e$ of the splinter-bar B, that the power exerted by a single horse hitched to whiffletree D will equalize the pulling force of the three horses hitched to whiffletrees R, S, and O. After each cut in the field the horse hitched to whiffletree D will turn the reaper with the most ease.

What I claim is—

1. The combination, with vehicle-tongue A and pulley $i$, secured upon the rear thereof, of splinter-bar B, pivotally secured with one end upon tongue A, having connected to its opposite end a whiffletree D, and having coupled at an intermediate point one end of a chain $h$, passed over pulley $i$, and being coupled with its opposite end to the doubletree L, that to its longer end has a whiffletree O and to its shorter end a doubletree Q with whiffletrees R and S, all substantially as set forth.

2. The combination, with vehicle-tongue A and pulley $i$, secured upon the rear thereof, of splinter-bar B, pivotally secured with one end by a bolt $a$ upon tongue A, having connected to its opposite end the whiffletree D, and having coupled at an intermediate point one end of a chain $h$, passed over pulley $i$, guided by pulley $m$ and secured under splinter-bar B and being coupled with its opposite end to the doubletree L, that to its longer end has a whiffletree O and to its shorter end a doubletree Q, with whiffletrees R and S, all substantially as set forth.

In testimony whereof I affix my signature in presence of two witnesses.

JOHN KOELLE.

Witnesses:
 WM. H. LOTZ,
 OTTO LUEBKERT.